(12) United States Patent
Blackwell

(10) Patent No.: US 8,514,729 B2
(45) Date of Patent: Aug. 20, 2013

(54) METHOD AND SYSTEM FOR ANALYZING RF SIGNALS IN ORDER TO DETECT AND CLASSIFY ACTIVELY TRANSMITTING RF DEVICES

(75) Inventor: Warren Blackwell, San Jose, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 88 days.

(21) Appl. No.: 12/418,526

(22) Filed: Apr. 3, 2009

(65) Prior Publication Data

US 2010/0254267 A1 Oct. 7, 2010

(51) Int. Cl.
*G01R 31/08* (2006.01)
(52) U.S. Cl.
USPC .......................................................... 370/252
(58) Field of Classification Search
USPC ........... 370/241, 252, 254; 455/435.1, 435.2; 342/90, 98
See application file for complete search history.

(56) References Cited

U.S. PATENT DOCUMENTS

| | | | |
|---|---|---|---|
| 6,714,605 B2 | 3/2004 | Sugar et al. | |
| 7,116,943 B2 * | 10/2006 | Sugar et al. | 455/67.11 |
| 7,184,777 B2 | 2/2007 | Diener et al. | |
| 7,570,193 B2 * | 8/2009 | Bagge | 342/20 |
| 2005/0032479 A1 * | 2/2005 | Miller et al. | 455/67.11 |
| 2006/0178124 A1 * | 8/2006 | Sugar | 455/226.1 |
| 2008/0019464 A1 | 1/2008 | Kloper et al. | |
| 2009/0185608 A1 | 7/2009 | Blackwell | |

OTHER PUBLICATIONS

International Search Report for corresponding PCT Patent Application PCT/US2010/029848, Jun. 1, 2010, 3 Pgs.
Written Opinion of the International Searching Authority for corresponding PCT Patent Application PCT/US2010/029848, Jun. 1, 2010, 7 Pgs.
Loh, Desmond C., et al., "Identifying Unique Devices through Wireless Fingerprinting", WiSec '08, Mar. 31, 2008, 10 pgs., Alexandria, VA, USA.
*Airmagnet Spectrum Analyzer*, AirMagnet, Feb. 4, 2009, 5 pgs, www.airmagnet.com/products/spectrum_analyzer/.
*AirMagnet WiFi Analyzer* (*Formerly Laptop Analyzer*), AirMagnet, Feb. 4, 2009, 4 pgs, www.airmagnet.com/products/wifi_analyzer/.
*Airmagnet AirMedic*, AirMagnet, Mar. 9, 2009, 3 pgs, www.airmagnet.com/products/airmedic/.
International Preliminary Report on Patentability for corresponding PCT Patent Application PCT/US2010/029848, mailed Oct. 13, 2011, 7 pp.

* cited by examiner

*Primary Examiner* — Mark Rinehart
*Assistant Examiner* — Peter Cheng
(74) *Attorney, Agent, or Firm* — Edwards Wildman Palmer LLP; Christopher J. Capelli; Adam P. Daniels

(57) ABSTRACT

Exemplary embodiments of methods and apparatuses to analyze RF signals in order to detect and classify RF devices in wireless networks are described. In one embodiment, a method includes detecting one or more radio frequency (RF) samples. Next, the method includes determining burst data by identifying start and stop points of the one or more RF samples. Next, the method includes comparing time domain values for an individual burst with time domain values of one or more predetermined RF device profiles. Next, the method includes generating a human-readable result indicating whether the individual burst should be assigned to one of the predetermined RF device profiles. Next, the method includes classifying the individual burst if assigned to one of the predetermined RF device profiles as being a WiFi device or a non-WiFi device with the non-WiFi device being a RF interference source to a wireless network.

16 Claims, 14 Drawing Sheets

METHOD AND SYSTEM FOR ANALYZING RF SIGNALS IN ORDER TO DETECT AND CLASSIFY ACTIVELY TRANSMITTING RF DEVICES

FIELD

At least some embodiments of the present invention generally relate to wireless networks, and more particularly, to analyzing RF signals in order to detect and classify actively transmitting RF devices.

BACKGROUND

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

Administrators of WLANs utilize spectrum analyzer tools, which help visualize and characterize RF device activity in 2.4 and 5 GHz bands that may interfere with the WLAN. Spectrum analyzer tools identify, classify, and find sources of RF interference that impact the performance of WLANs. The tools identify the specific types of devices that are causing RF interference and track them to their physical location, enabling administrators to resolve issues. However, the spectrum analyzer tools may include expensive hardware components and may be difficult to properly set up and utilize.

SUMMARY

Exemplary embodiments of methods and apparatuses to analyze RF signals in order to detect and classify RF devices in wireless networks are described. In one embodiment, a method includes detecting one or more radio frequency (RF) samples. Next, the method includes determining burst data by identifying start and stop points of the one or more RF samples. Next, the method includes comparing time domain values for an individual burst with time domain values of one or more predetermined RF device profiles. Next, the method includes generating a human-readable result indicating whether the individual burst should be assigned to one of the predetermined RF device profiles. Next, the method includes classifying the individual burst if assigned to one of the predetermined RF device profiles as being a WiFi device or a non-WiFi device with the non-WiFi device being a RF interference source to a wireless network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
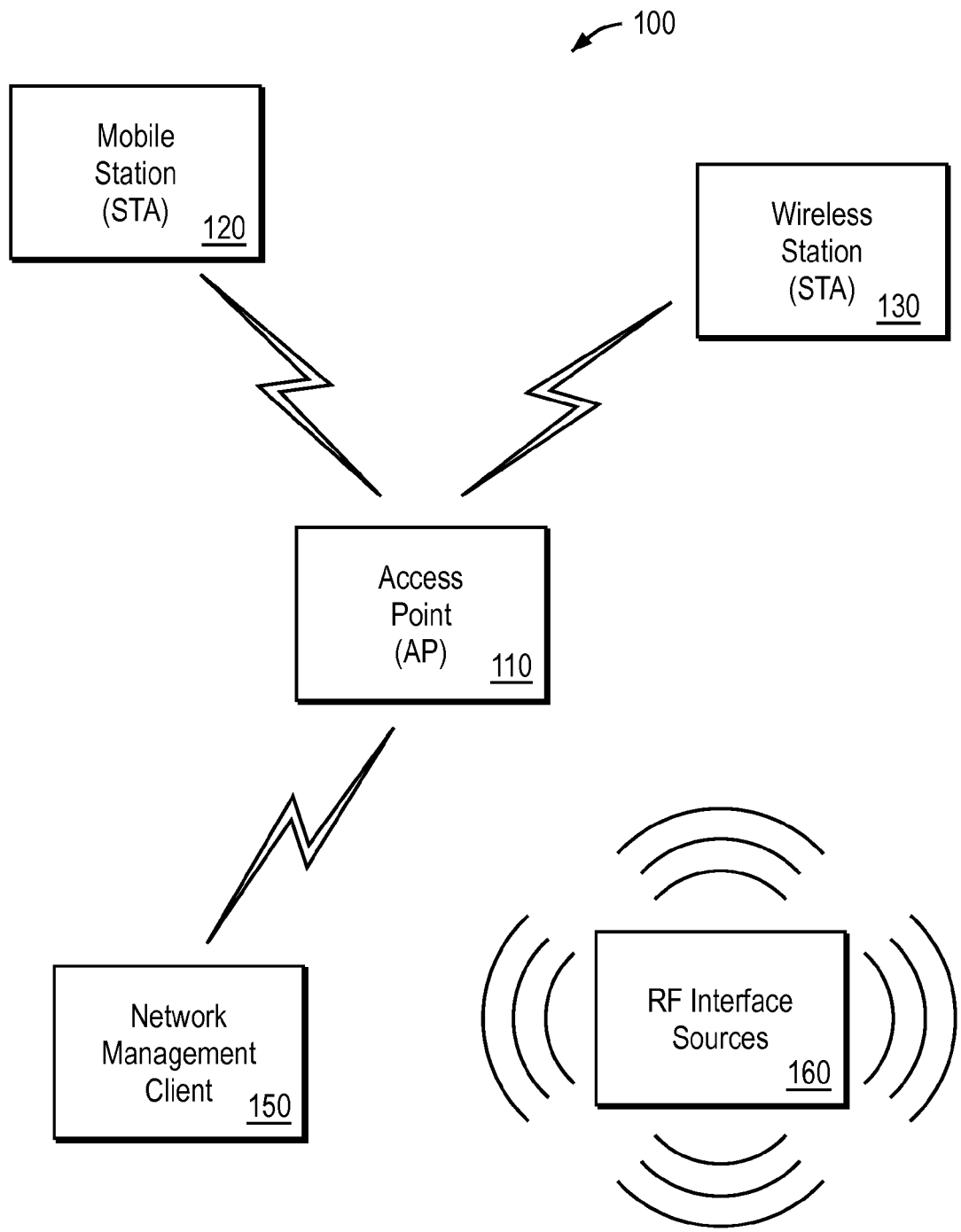
FIG. 1 is a block diagram of one embodiment of a wireless network.

FIG. 1 is a block diagram of one embodiment of a wireless network. FIG. 1 provides an example network with a limited number of network elements for reasons of simplicity only. The techniques and components described herein can be utilized in a network having any number of access points, wireless stations, network management clients, and RF interference sources. In one embodiment, network 100 operates using at least IEEE 802.11 compliant wireless communications; however, the strategies described herein may be utilized in wireless networks using other wireless communication protocols.

Referring to FIG. 1, access point 110 is any wireless access point (AP) that may provide wireless communications with one or more stations (STAs). For example, access point 110 may provide a wired interface to an external network (not illustrated in FIG. 1). In one embodiment, access point 110 also provides a wireless interface to another network (also not illustrated in FIG. 1). In one embodiment, access point 110 supports the IEEE 802.11n protocol. That is, access point 110 may provide communications compliant with at least the IEEE 802.11n protocol. Other protocols, whether wired or wireless, may also be supported by access point 110.

In the example of FIG. 1, mobile station 120 and wireless station 130 communicate with access point 110 using wireless protocols. In one embodiment, mobile station 120 is any type of mobile device that can communicate using the wireless protocols supported by access point 110. For example, mobile station 120 can be a laptop computer, a smartphone, a tablet device, etc. In one embodiment, wireless station 130 may be any type of device, whether mobile or not, that can communicate using the wireless protocols supported by access point 110. For example, wireless station 130 can be a desktop computer, a real-time sensor, etc.

Network management client 150 may be any type of electronic device that provides network management services to wireless network 100. As described in greater detail below, network management client 150 monitors RF samples including communications between access point 110, mobile station 120, wireless station 130 (and other network devices as well), and client 150 as well as interfering RF signals from RF interference sources 160 (e.g., Bluetooth devices, cordless phones, microwaves, analog video cameras, RF jammers) to gather information that may be used in managing wireless network 100. In one embodiment, network 100 includes additional sensors coupled with network management client 150 (not illustrated in FIG. 1) that may allow network management client 150 to monitor a wider geographic area than would otherwise be possible.

In one embodiment, network management client 150 provides lab-quality spectrum analysis and basic WiFi traffic analysis into one simple view. Using this view, a user can see RF interference within wireless network 100 with the client 150, and know immediately the real impact it is having on end-users in the network. If a wireless network problem is not due to RF interference, the user can see which channels and devices are having network problems with the wireless network 100.

Figure 2A:
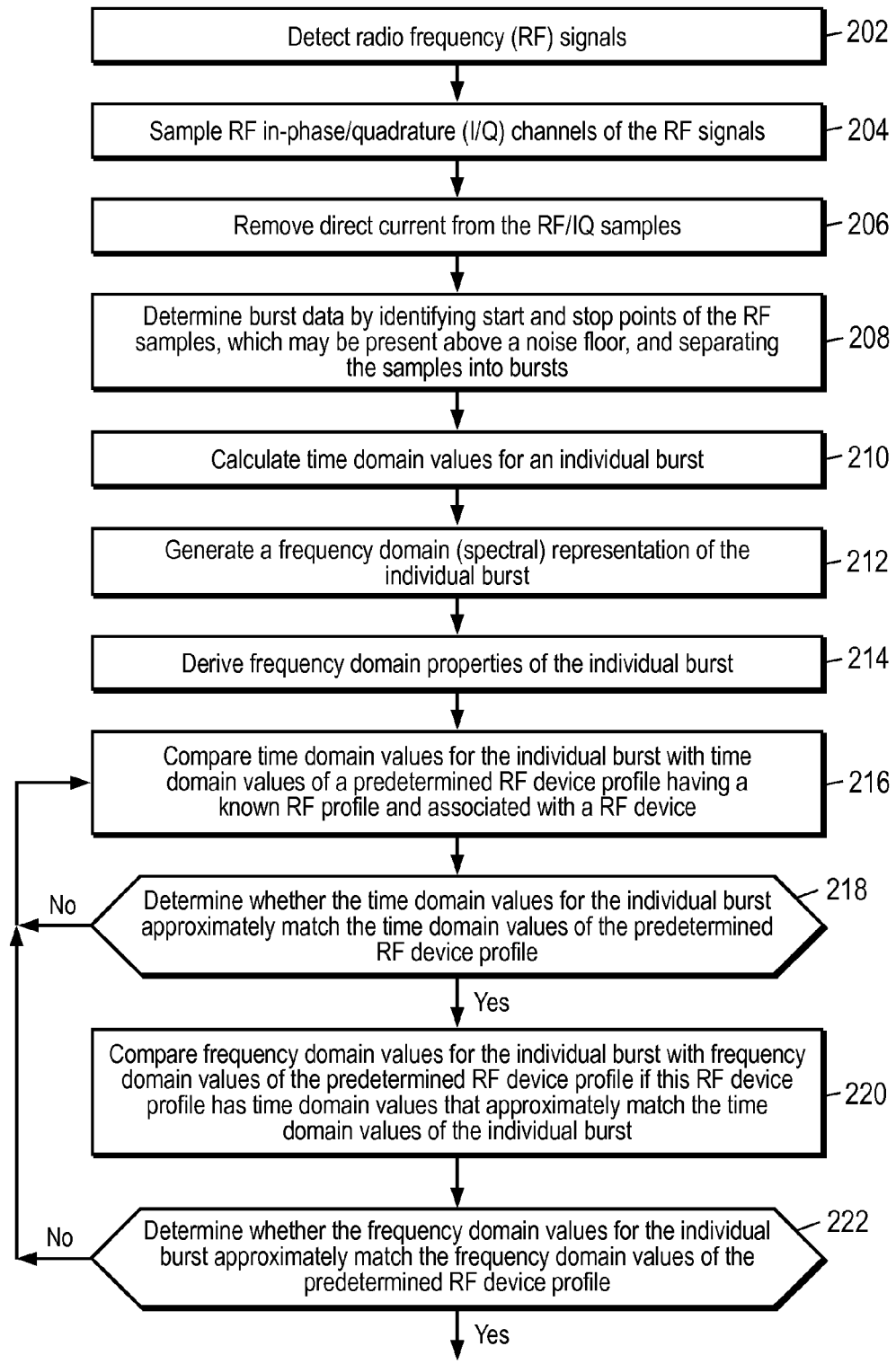
FIGS. 2A and 2B illustrate a flow diagram of one embodiment of a method for analyzing RF signals in order to detect and classify actively transmitting RF devices.
Figure 2B:
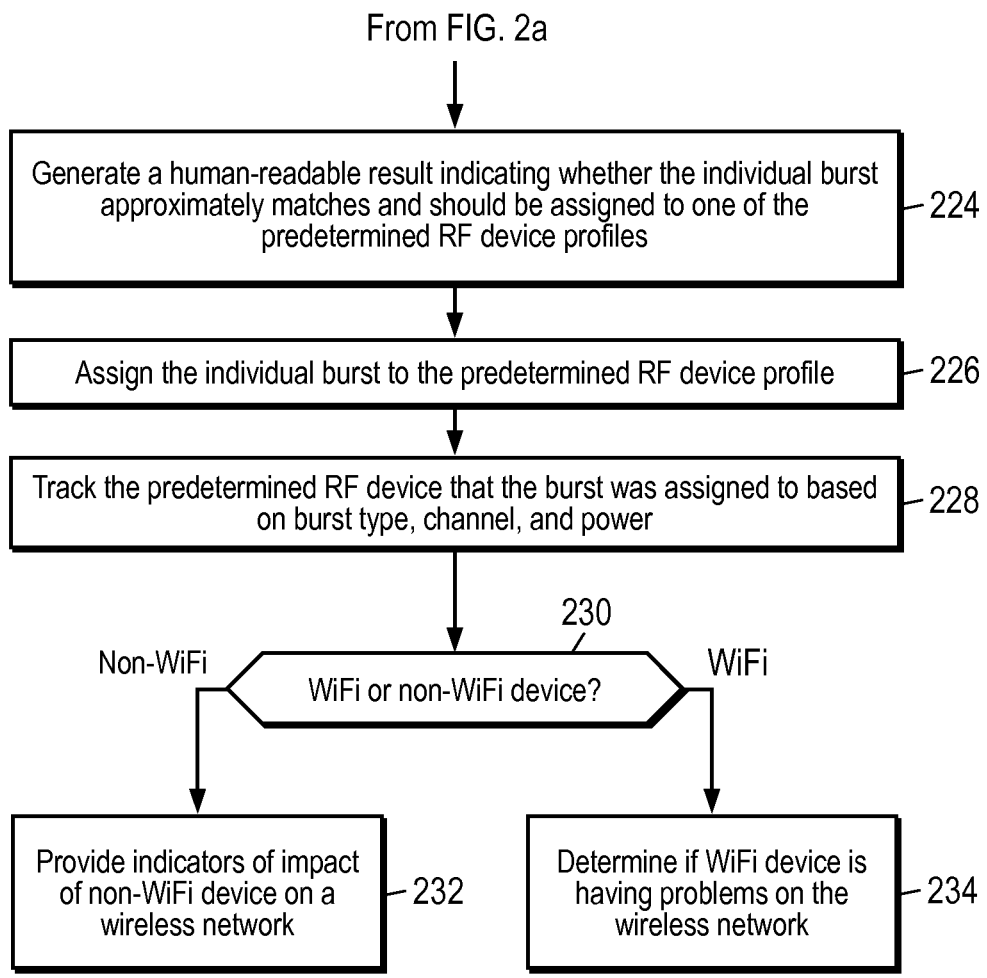

FIGS. 2A and 2B illustrate a flow diagram of one embodiment of a process for analyzing RF signals in order to detect and classify actively transmitting RF devices. In one embodiment, the operations of FIGS. 2A and 2B are performed by a network management client device; however, the operations may be performed by different devices and/or a combination of devices. These operations may be performed by hardware and/or software.

Figure 5:
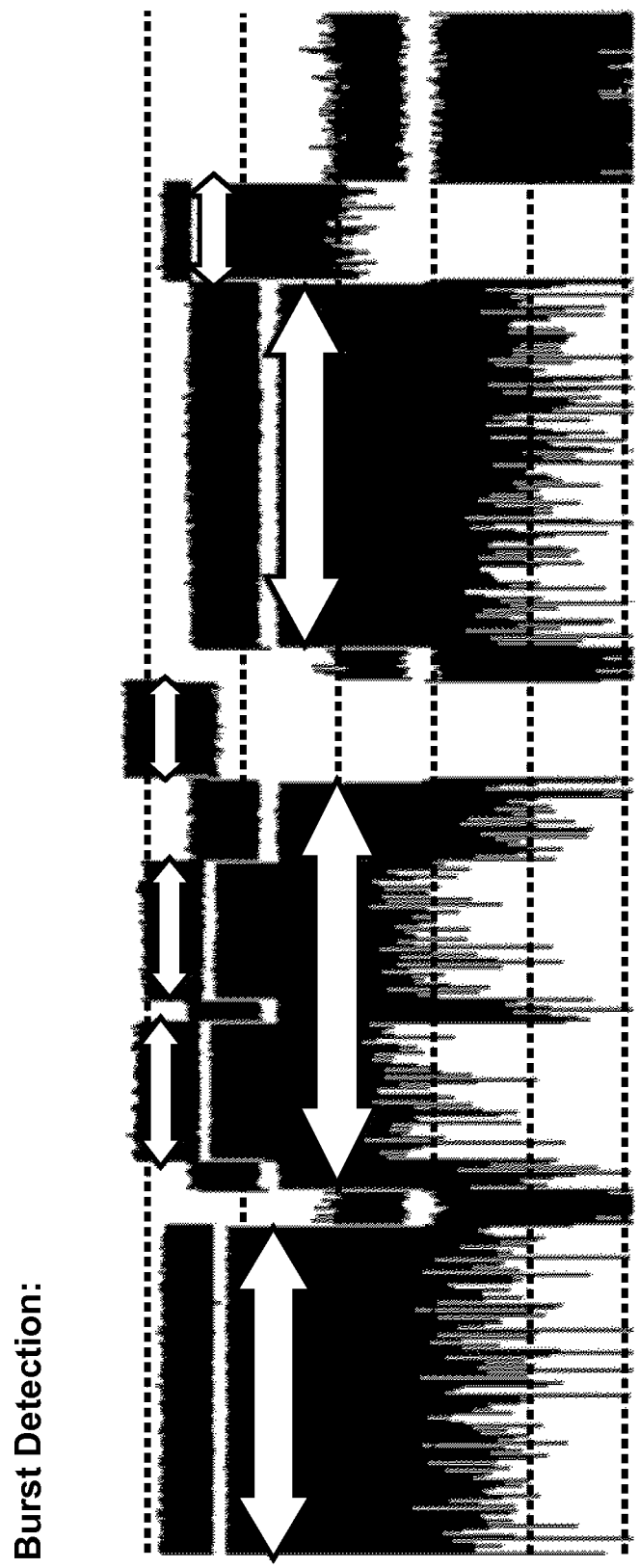
FIG. 5 illustrates exemplary burst data in accordance with one embodiment.
Figure 6:
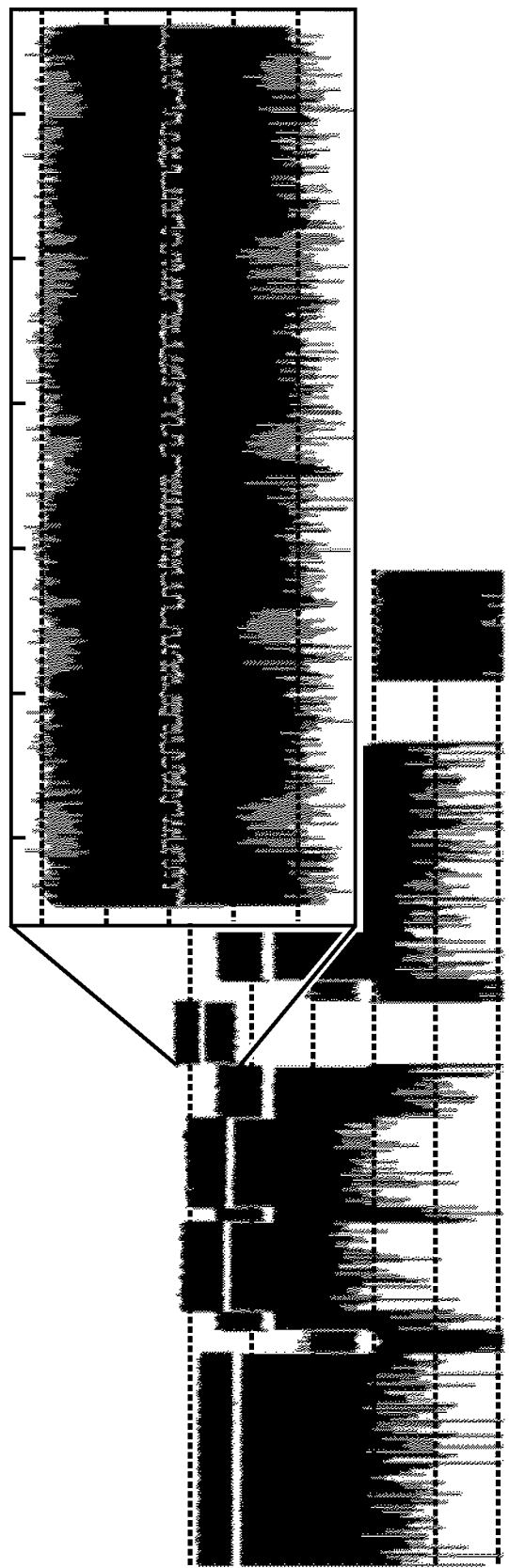
FIG. 6 illustrates an exemplary individual burst to be analyzed in accordance with one embodiment.

The process includes detecting radio frequency (RF) signals with a RF Front-End of the client 150 at processing block 202. The RF Front-End includes a radio that is configured and uses a scanning algorithm to detect the RF signals. Next, the process includes sampling RF in-phase/quadrature (I/Q) channels of the RF signals at processing block 204. At processing block 206, the process removes direct current from the RF I/Q samples. Next, the process determines burst data by identifying start and stop points of the RF samples, which may be present above a noise floor, and separating the samples into bursts at processing block 208. FIG. 5 illustrates exemplary potential bursts to be analyzed in accordance with one embodiment. The arrows indicate start and stop points of the potential bursts. Next, the process includes calculating time domain values for an individual burst at processing block 210. An exemplary individual burst to be analyzed is illustrated in FIG. 6 in accordance with one embodiment. In one embodiment, the time domain values include absolute values, power values (e.g., minimum, mean, and peak power), a peak to average power ratio, and a duration for the burst.

Figure 7:
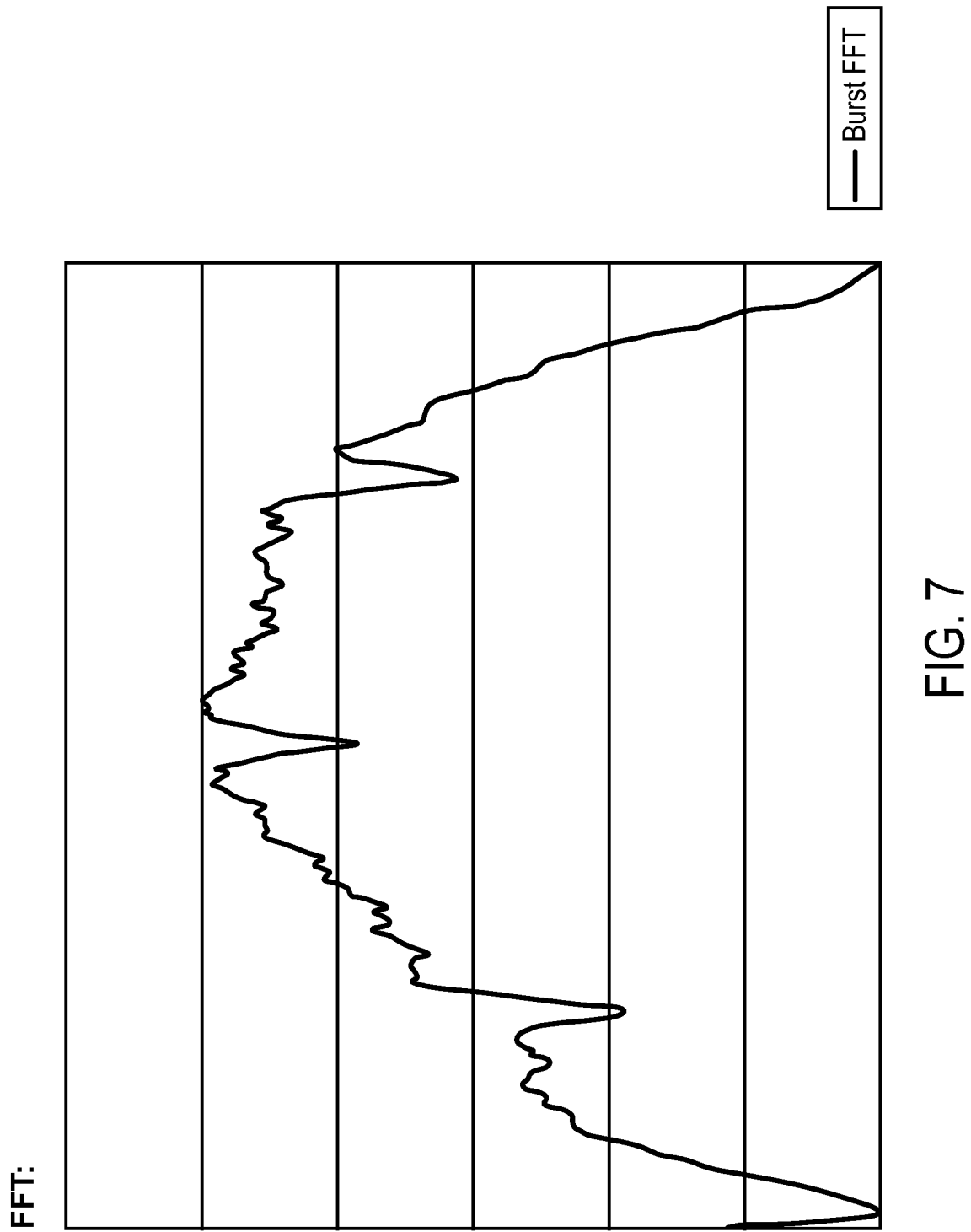
FIG. 7 illustrates the spectral representation of an exemplary individual burst in accordance with one embodiment.

Next, the process generates a frequency domain (spectral) representation of the individual burst at processing block 212 using a fast fourier transform (FFT) (e.g., Cooley-Tukey based FFT algorithm). FIG. 7 illustrates a spectral representation of an exemplary individual burst in accordance with one embodiment. Next, the process derives frequency domain properties of the individual burst at processing block 214. In one embodiment, the frequency domain properties include channel, center frequency, etc. In an embodiment, a FFT is shifted, the FFT output is decimated to analysis resolution, or scaled. If a single carrier is offset from a scan center frequency, then an offset can be calculated, followed by shifting the frequency in the time domain, and then perform the above frequency domain operations again.

Next, the process includes comparing time domain values for the individual burst with time domain values of a predetermined RF device profile having a known RF profile and associated with a RF device at processing block 216. The predetermined RF device profiles may have been previously identified within a certain proximity to the client 150 or the predetermined RF device profiles may be known RF device profiles of known RF devices (e.g., WiFi devices, non-WiFi devices). In one embodiment, the time domain values being compared include a peak to average power ratio minimum, a peak to average power ratio maximum, a mean delta maximum, a maximum delta maximum, a maximum delta difference, a maximum delta difference maximum count, and a duration. In other embodiments, a subset of these time domain values are compared.

Figure 8:
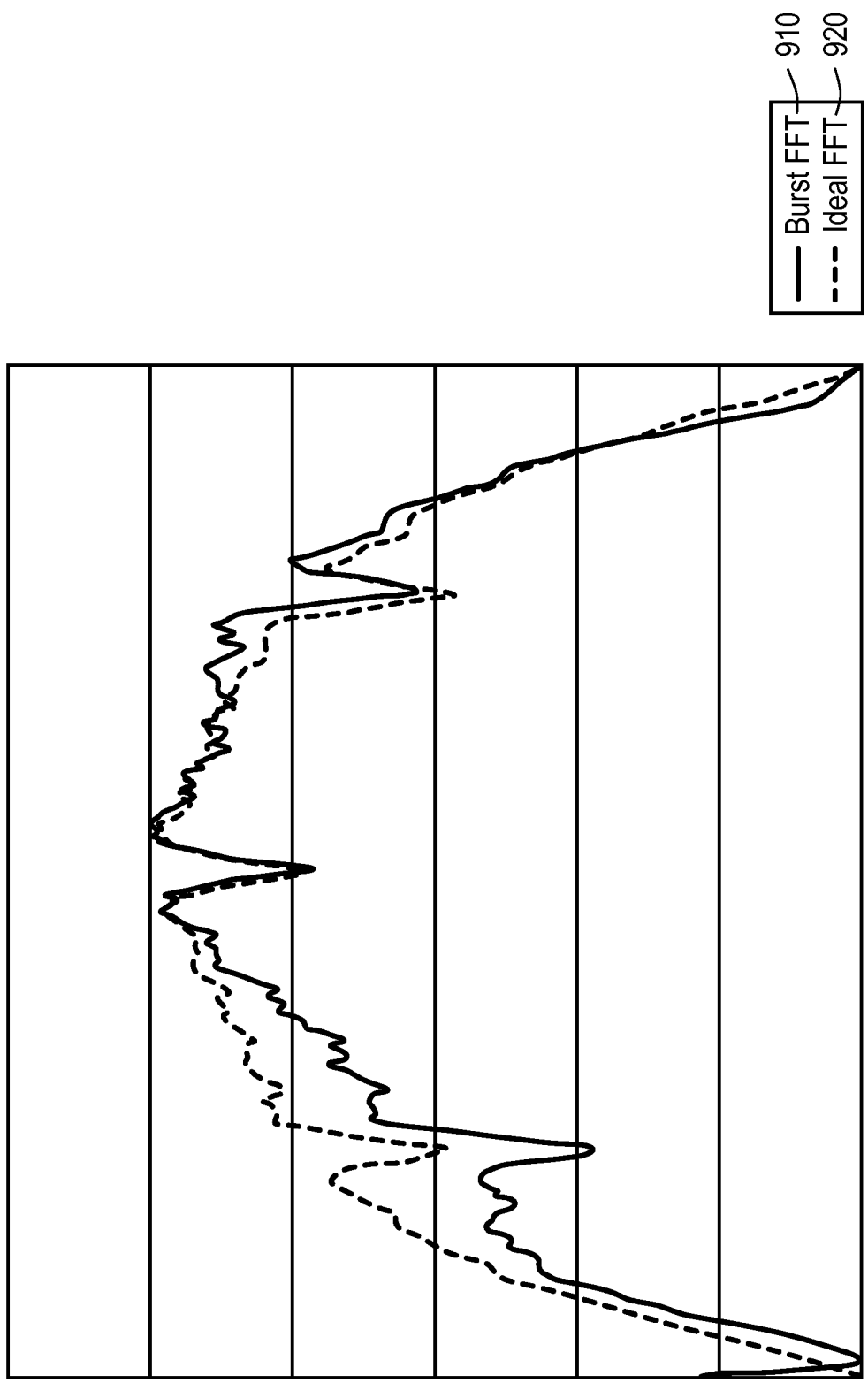
FIG. 8 illustrates a comparison between an exemplary burst FFT 910 and an exemplary ideal FFT 920 in accordance with one embodiment.

Next, the process includes determining whether the time domain values for the individual burst approximately match the time domain values of the predetermined RF device profile at processing block 218. Next, the process includes comparing frequency domain values for the individual burst with frequency domain values of the predetermined RF device profile if this RF device profile has time domain values that approximately match the time domain values of the individual burst at processing block 220. In one embodiment, FIG. 8 illustrates a comparison between an exemplary burst FFT 910 and an exemplary predetermined FFT 920, which may be a predetermined device profile for a device having time domain properties that approximately match the time domain properties of the burst.

If the time domain values of the burst do not approximately match the time domain values of a device profile at processing block 218, then the process returns to processing block 216 and compares the time domain values of the burst with one or more additional device profiles. In an embodiment, a confidence algorithm is used to determine whether the time domain values approximately match. In one embodiment, 10 to 30 device profiles associated with RF devices (e.g., WiFi devices, non-WiFi devices) are available for comparison.

Next, the process includes determining whether the frequency domain values for the individual burst approximately match the frequency domain values of the predetermined RF device profile at processing block 222. In one embodiment, this determination occurs by generating a human-readable result indicating whether the individual burst approximately matches and should be assigned to one of the predetermined RF device profiles at processing block 224.

Figure 9:
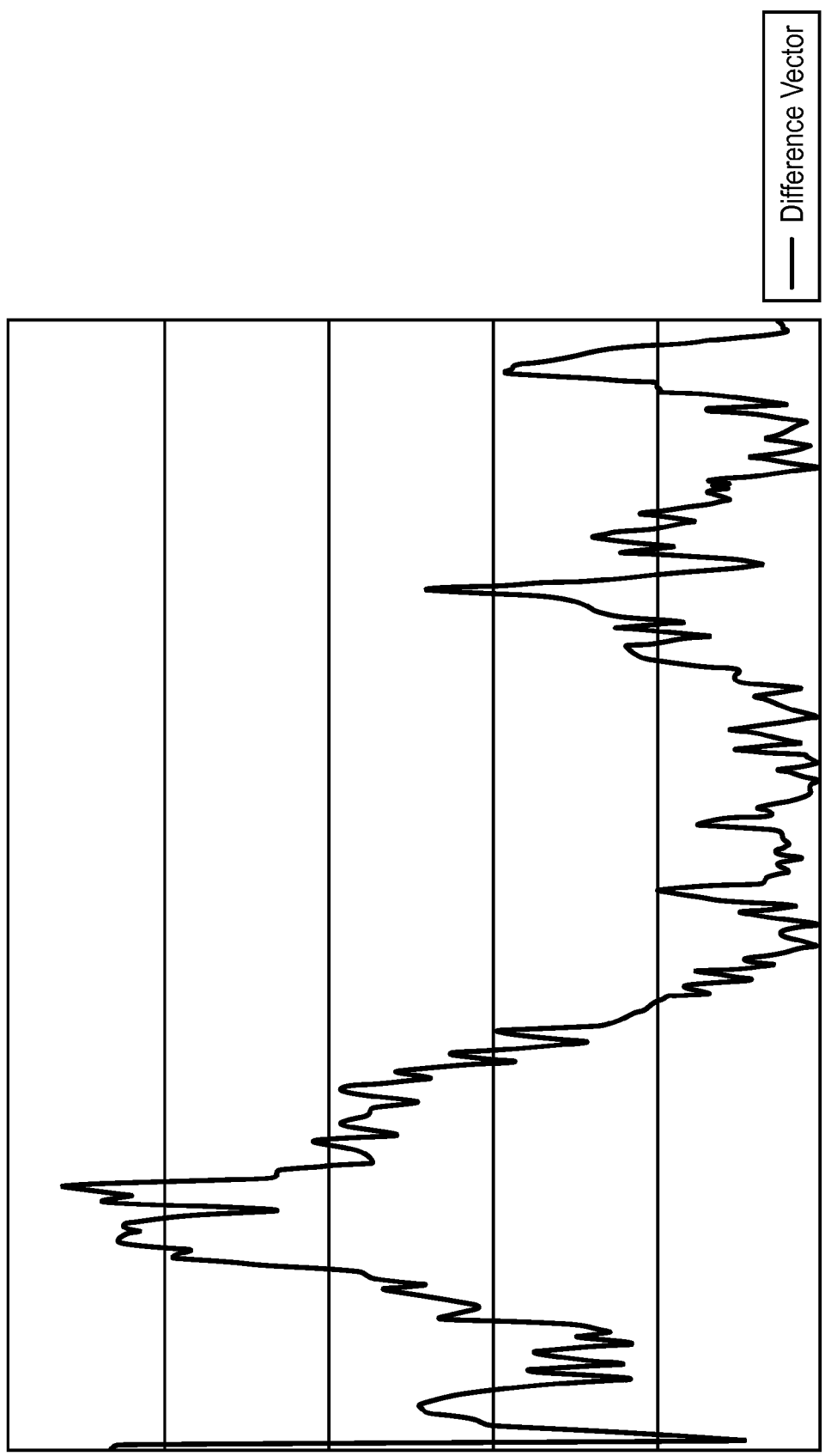
FIG. 9 illustrates an exemplary difference vector in accordance with one embodiment.

In one embodiment, the result is a difference vector illustrating in graphical form a difference between a burst FFT and a predetermined FFT associated with the predetermined RF device profile. FIG. 9 illustrates an exemplary difference vector in accordance with one embodiment. For the comparison of the burst FFT 910 and the predetermined FFT 920, these spectral representations, in one embodiment, have a mean difference of 7, a maximum difference of 23, and have 14 points with a difference greater 15. Thus, burst FFT 910 approximately matches FFT 920.

In some embodiments, a value for the difference vector defines how far away any point in the burst FFT 910 is from a corresponding point in the FFT 920 without incrementing a "critical violation" count. For example, the value may be set to greater than 15 before incrementing the "critical violation" count. This is used for RF profiles which have a particular region of interest, for which one may define tighter constraints for determining a match.

In an embodiment, the result is a confidence level indicating a likelihood of having found a match. The result is determined by an algorithm that calculates various statistical parameters including at least one of the mean difference, maximum difference, minimum difference, number of points with a difference greater and/or less than a threshold, location, or any other parameter that indicates whether the individual burst approximately matches the predetermined device profile.

Additionally, the process, which may be a machine implemented algorithm, examines burst length (in time) in order to qualify/disqualify potential matches. For instance, Bluetooth devices have a fixed packet length, and devices which appear similar to Bluetooth devices in the frequency domain, but have differing length than what is allowed for Bluetooth will not be classified as Bluetooth devices. Additionally, in one embodiment, the algorithm inspects, or demodulates/decodes the preamble-type information (e.g., PLCP) in order to further identify or classify devices.

If a match occurs at processing block 224, then the process assigns the individual burst to the predetermined RF device profile at processing block 226. In one embodiment, the burst FFT 910 would be assigned to the predetermined burst 920 and RF device associated with the burst 920. If a match does not occur, then the process returns to processing block 216. Next, the process tracks the predetermined RF device profile and associated RF device that the burst was assigned at block 228. In one embodiment, the tracking is based on burst type, channel, and power of the RF device at processing block 228.

At block 230, the process classifies the individual burst that approximately matches the predetermined RF device profile as a WiFi device or a non-WiFi device. Non-WiFi devices (e.g., Bluetooth devices, cordless phones, microwaves, analog video cameras, RF jammers) are considered to be RF interference sources or intruders to the wireless network 100. At block 232, the process provides indicators of the impact of the non-WiFi device on the wireless network. Indicators include information about the frequencies/channels that the non-WiFi device uses, power level information, and duty cycle/hit rate for the non-WiFi device. At block 234, the process determines if the WiFi device is having problems (e.g., low data speed) with the wireless network 100. In an embodiment, this problem is based on the WiFi device being overloaded and/or having configuration issues. A user monitoring the wireless network can then take appropriate action to optimize network performance of the WiFi device and/or minimize the impact of the intruding non-WiFi device on the wireless network.

In an embodiment, the above operations of the process can be repeated to classify and analyze some or all of the individual bursts in the burst data. For example, the above operations of FIGS. 2A and 2B may be repeated to classify and analyze other individual bursts.

Figure 3:
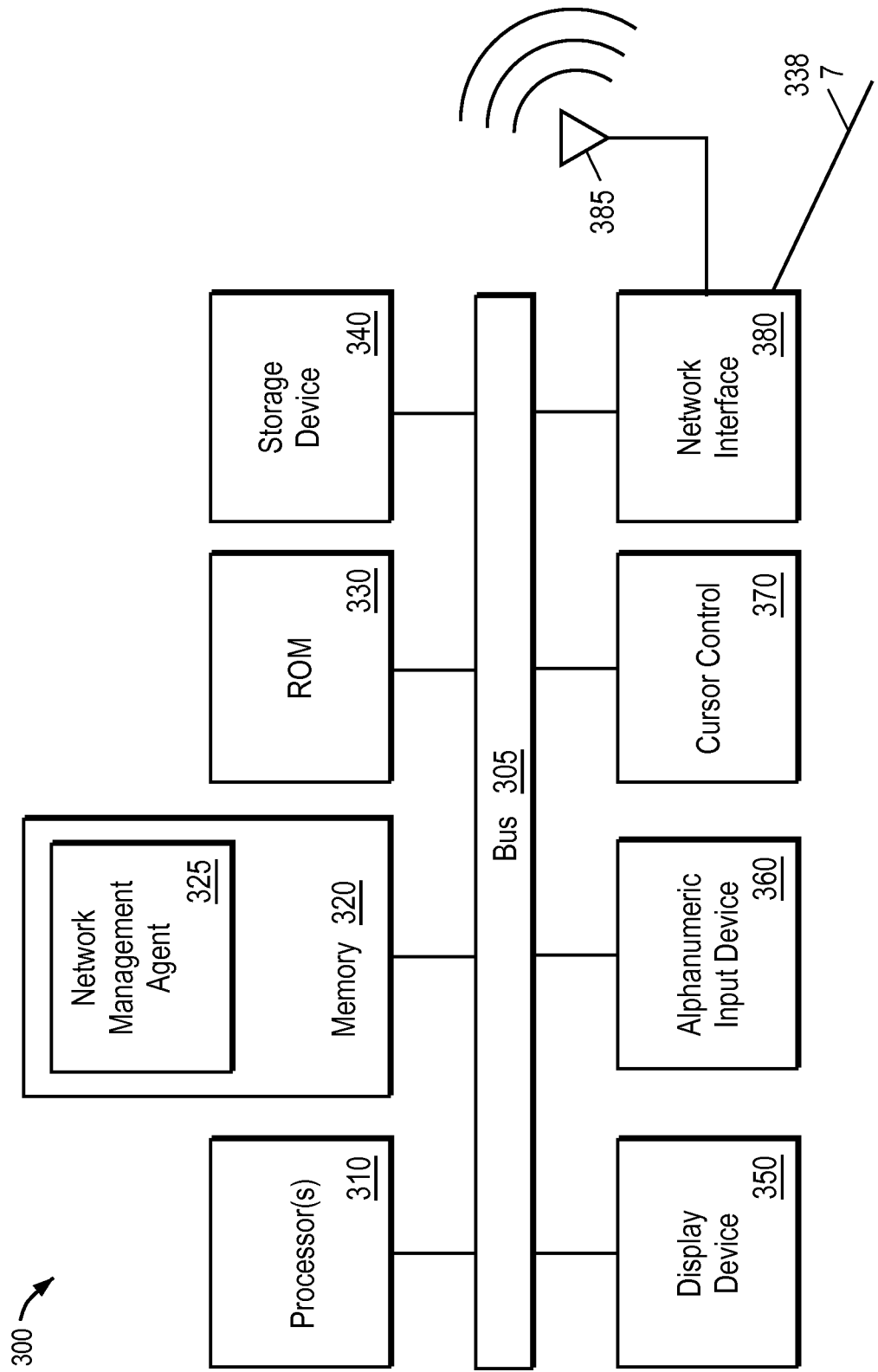
FIG. 3 is a block diagram of one embodiment of an electronic system that may operate as a network management client device.

FIG. 3 is a block diagram of one embodiment of an electronic system that may operate as a network management client device. The electronic system illustrated in FIG. 3 is intended to represent a range of electronic systems including, for example, desktop computer systems, laptop computer systems, cellular telephones, personal digital assistants (PDAs) including cellular-enabled PDAs, set top boxes. Alternative electronic systems may include more, fewer and/or different components.

Electronic system 300 includes bus 305 or other communication device(s) to communicate information, and processor 310 coupled to bus 305 that may process information. While electronic system 300 is illustrated with a single processor, electronic system 300 may include multiple processors and/or co-processors. Electronic system 300 further may include random access memory (RAM) or other dynamic storage device 320 (referred to as main memory), coupled to bus 305 and may store information and instructions that may be executed by processor 310. Main memory 320 may also be used to store temporary variables or other intermediate information during execution of instructions by processor 310.

In one embodiment, network management agent 325 resides in memory 320. Network management agent 325 may provide some or all of the network management functionality described herein. Network management agent 325 may be implemented as software, hardware, firmware or any combination thereof. In some embodiments, instructions that implement network management agent 325 may be executed by processor 310 or some other processing component.

Electronic system 300 may also include read only memory (ROM) and/or other static storage device 330 coupled to bus 305 that may store static information and instructions for processor 310. Data storage device 340 may be coupled to bus 305 to store information and instructions. Data storage device 340 such as a magnetic disk or optical disc and corresponding drive may be coupled to electronic system 300.

Electronic system 300 may also be coupled via bus 305 to display device 350, such as a cathode ray tube (CRT) or liquid crystal display (LCD), to display information to a user. Alphanumeric input device 360, including alphanumeric and other keys, may be coupled to bus 305 to communicate information and command selections to processor 310. Another type of user input device is cursor control 370, such as a mouse, a trackball, or cursor direction keys to communicate direction information and command selections to processor 310 and to control cursor movement on display 350.

Electronic system 300 further may include network interface(s) 380 to provide access to a network, such as a local area network. Network interface(s) 380 may include, for example, a wireless network interface having a RF Front-End and an antenna 385, which may represent one or more antenna(e). Network interface(s) 380 may also include, for example, a wired network interface to communicate with remote devices via network cable 387, which may be, for example, an Ethernet cable, a coaxial cable, a fiber optic cable, a serial cable, or a parallel cable.

In one embodiment, network interface(s) 380 may provide access to a local area network, for example, by conforming to IEEE 802.11n and IEEE 802.11b and/or IEEE 802.11g standards, and/or the wireless network interface may provide access to a personal area network, for example, by conforming to Bluetooth standards. Other wireless network interfaces and/or protocols can also be supported.

Instructions are provided to memory from a storage device, such as magnetic disk, a read-only memory (ROM) integrated circuit, CD-ROM, DVD, via a remote connection (e.g., over a network via network interface 330) that is either wired or wireless, etc. In alternative embodiments, hard-wired circuitry can be used in place of or in combination with software instructions. Thus, execution of sequences of instructions is not limited to any specific combination of hardware circuitry and software instructions.

A computer-readable medium includes any mechanism that provides content (e.g., computer executable instructions) in a form readable by an electronic device (e.g., a computer, a personal digital assistant, a cellular telephone). For example, a computer-readable medium may include read only memory (ROM); random access memory (RAM); magnetic disk storage media; optical storage media; flash memory devices; etc.

Figure 4:
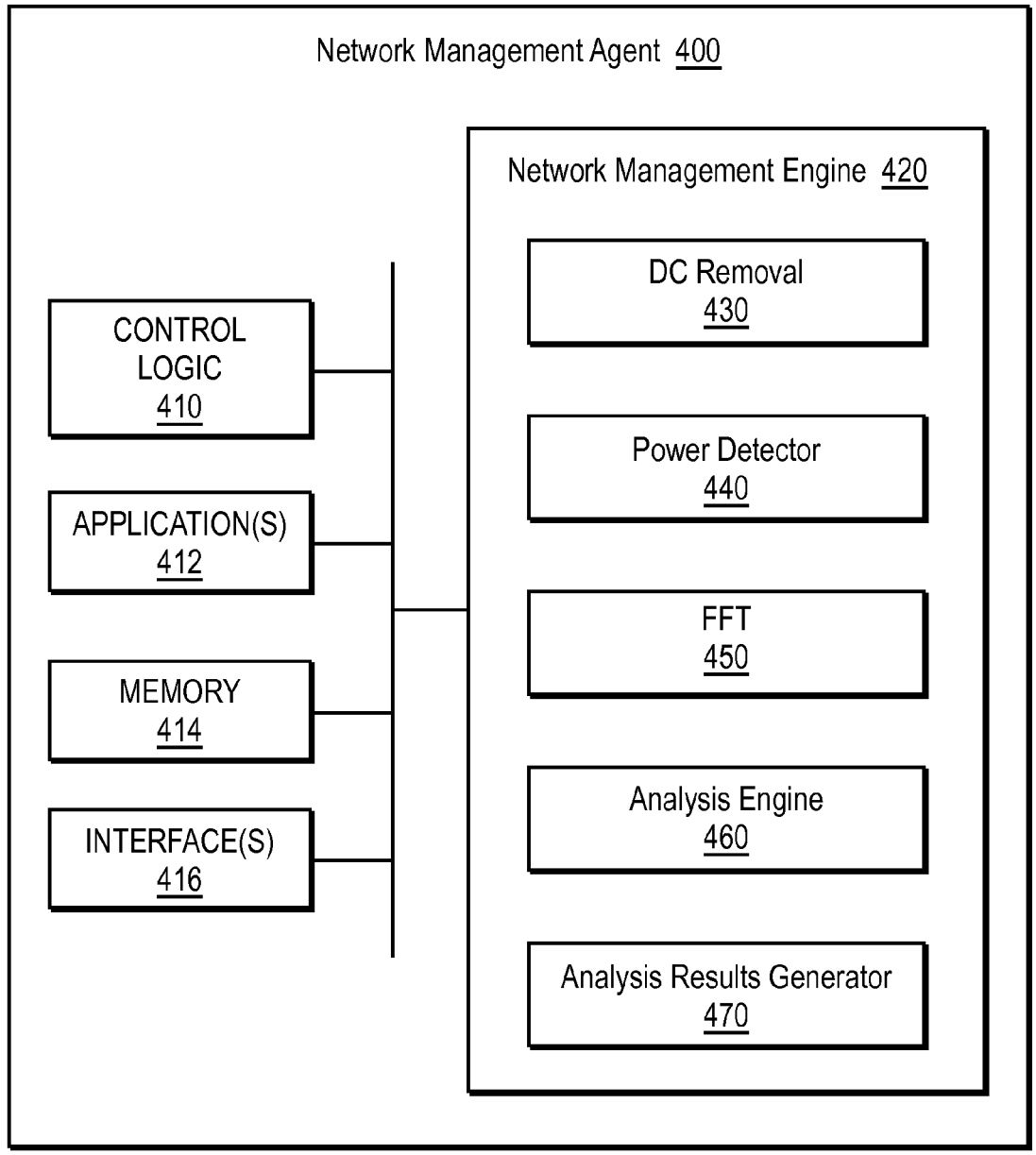
FIG. 4 is a block diagram of one embodiment of a network management agent.

FIG. 4 is a block diagram of one embodiment of a network management agent. Network management agent 400 includes control logic 410, which implements logical functional control to direct operation of network management agent 400, and/or hardware associated with directing operation of network management agent 400. Logic may be hardware logic circuits and/or software routines and/or firmware. In one embodiment, network management agent 400 includes one or more applications 412, which represent code sequence and/or programs that provide instructions to control logic 410.

Network management agent 400 includes memory 414, which represents a memory device and/or access to a memory resource for storing data and/or instructions. Memory 414 may include memory local to network management agent 400, as well as, or alternatively, including memory of the host system on which network management agent 400 resides. Network management agent 400 also includes one or more interfaces 416, which represent access interfaces to/from (an input/output interface) network management agent 400 with regard to entities (electronic or human) external to network management agent 400.

Network management agent 400 also includes network management engine 420, which represents one or more functions that enable network management agent 400 to provide the real-time, or near real-time, network spectrum analysis as described above. The example of FIG. 4 provides several components that may be included in network management engine 420; however, different and/or additional components may also be included. Example components that may be involved in providing the analysis environment include DC removal 430, Power Detector 440, FFT 450, analysis engine 460, and analysis results generator 470. Each of these components may further include other components to provide other functions. As used herein, a component refers to routine, a subsystem, etc., whether implemented in hardware, software, firmware or some combination thereof.

DC removal 430 removes DC from I/Q samples. Power Detector 440 identifies start and stop points of any signals, which may be above a noise floor, and separates them into bursts. Each of these bursts is fed into a FFT algorithm 450, which generates the frequency (spectral) domain representation of each burst.

The time domain burst values and frequency domain values are calculated with the analysis engine 460 based on the burst data and the spectral representation, respectively. The analysis engine 460 compares time domain values of a burst to time domain values of one or more devices profiles. The analysis engine 460 also compares frequency domain values of a burst to frequency domain values of one or more device profiles. The analysis engine 460 determines whether time domain values of a burst match time domain values of a device profile. If so, then the analysis engine proceeds to determine if frequency domain values of the burst match frequency domain values of the device profile.

An analysis results generator 470 may provide results from the analysis engine 460 in a human-usable format. For example, analysis results generator 470 may generate a color-coded graphical representation of the monitored network where various colors indicate channel quality, bandwidth, and/or other characteristics. A representation of the monitored network may include detected and classified transmitting RF devices. In one embodiment, analysis results generator 470 also provides a numerical indication of various network characteristics. As another example, analysis results generator 470 may generate a message (e-mail, text, etc.) to a network administrator if certain characteristics are considered too high or too low.

FIGS. 10-13 illustrate exemplary user interfaces of a client 150 during the detection and classification of actively transmitting RF devices in accordance with one embodiment.

Figure 10:
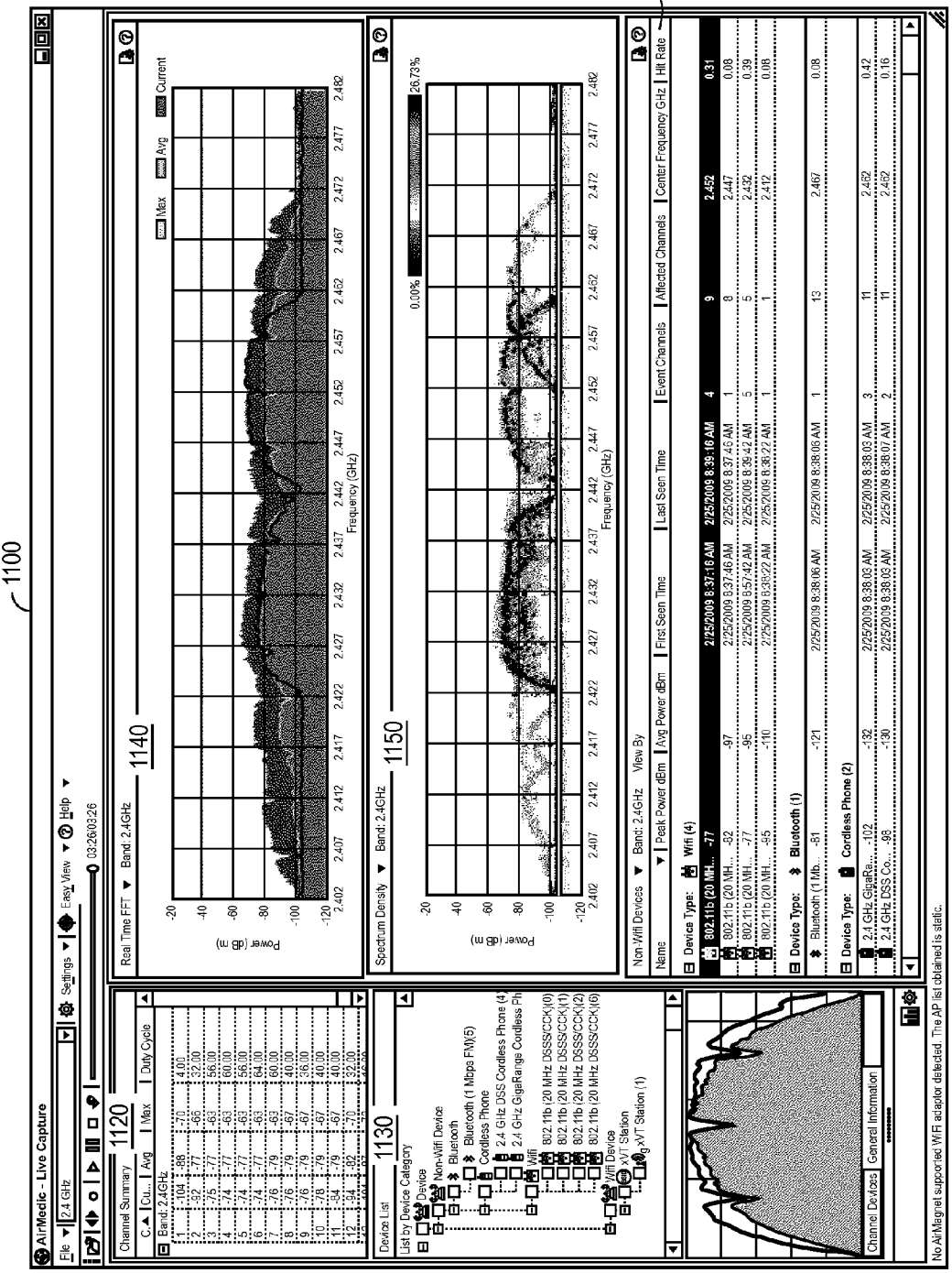
FIGS. 10-13 illustrate exemplary user interfaces of a client 150 during the detection and classification of actively transmitting RF devices in accordance with one embodiment.

FIG. 10 illustrates an exemplary user interface of a client 150 with a first selected WiFi device in accordance with one embodiment. The user interface 1100 includes a channel summary 1120 showing a list of channels for a 2.4 GHz frequency band. A device list 1130 includes a list of devices detected by the network interface 380 of the client 150. The devices include WiFi and non-WiFi devices. Device type 1160 provides additional information regarding each type of device. A user has selected for analysis the first WiFi device listed in device type 1160. A real-time FFT 1140 illustrates maximum, average, and current power levels across the 2.4 GHz frequency band for the selected WiFi device for real-time RF analysis. A spectrum density 1150 illustrates the spectrum density across the 2.4 GHz frequency band for the selected WiFi device to see patterns that reveals signals that are difficult to see in real-time.

Figure 11:
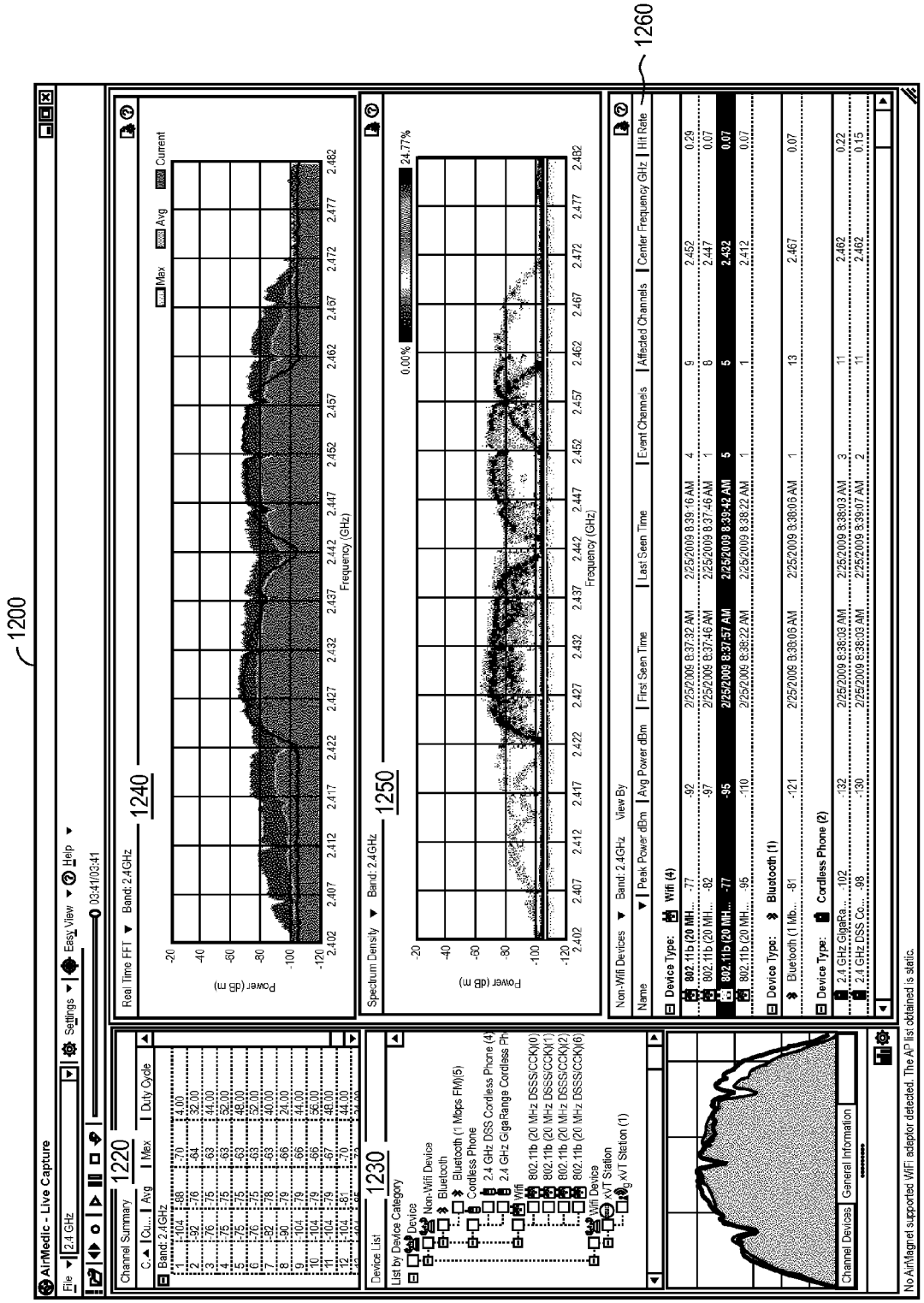

FIG. 11 illustrates an exemplary user interface of a client 150 with a third selected WiFi device in accordance with one embodiment. The user interface 1200 includes a channel summary 1220 showing a list of channels for a 2.4 GHz frequency band. A device list 1230 includes a list of devices detected by the network interface 380 of the client 150. The devices include WiFi and non-WiFi devices. Device type 1260 provides additional information regarding each type of device. A user has selected for analysis the third WiFi device listed in device type 1160. A real time FFT 1240 illustrates maximum, average, and current power levels across the 2.4 GHz frequency band for the selected WiFi device. A spectrum density 1250 illustrates the spectrum density across the 2.4 GHz frequency band for the selected WiFi device.

Figure 12:
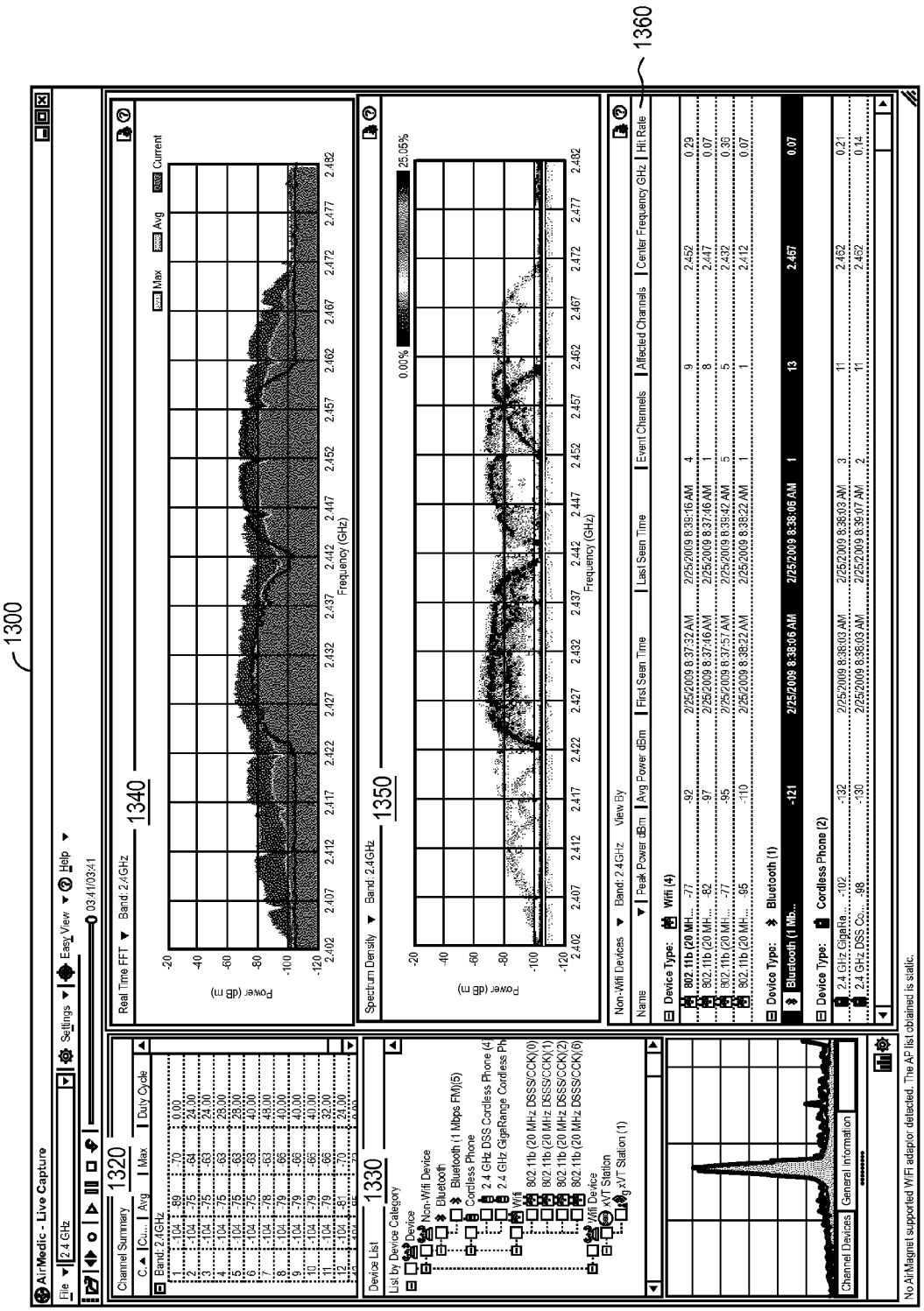

FIG. 12 illustrates an exemplary user interface of a client 150 with a selected Bluetooth device in accordance with one embodiment. The user interface 1300 includes a channel summary 1320 showing a list of channels for a 2.4 GHz frequency band. A device list 1330 includes a list of devices detected by the network interface 380 of the client 150. The devices include WiFi and non-WiFi devices. Device type 1360 provides additional information regarding each type of device. A user has selected for analysis a Bluetooth device listed in device type 1360. A real time FFT 1340 illustrates maximum, average, and current power levels across the 2.4 GHz frequency band for the selected Bluetooth device. A spectrum density 1250 illustrates the spectrum density across the 2.4 GHz frequency band for the selected Bluetooth device.

Figure 13:
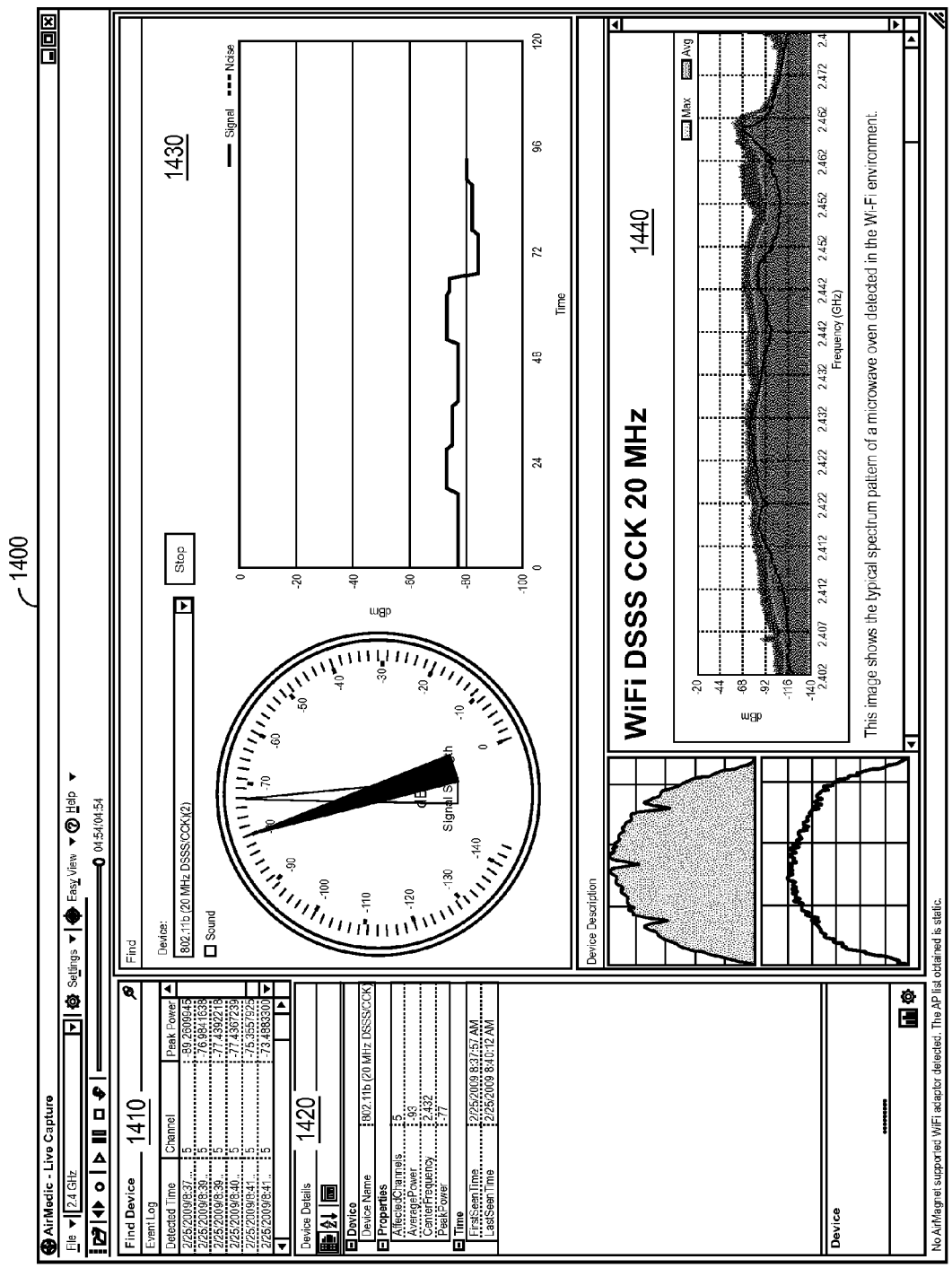

FIG. 13 illustrates an exemplary user interface of a client 150 with a selected device in accordance with one embodiment. The user interface 1400 includes a find device 1410 showing an event log of detected times on channel 5 for the WiFi DSSS CCK 20 MHZ device. A device details 1420 includes device name, properties, and time seen by the client 150. A sound display 1430 displays sound signal strength versus time. A real time FFT 1440 illustrates maximum, average, and current power levels across the 2.4 GHz frequency band for the selected WiFi DSSS CCK 20 MHZ device (e.g., a microwave oven).

In one embodiment, FIGS. 10-13 illustrate user interfaces for the client 150 having the network management agent 325 integrated with processor technology. In another embodiment, the agent 325 is located with a wireless adapter coupled to the client 150. Additional functionality is provided including a spectrogram that provides a rolling RF history for seeing intermittent RF bursts. In another embodiment, an additional wireless adapter provides additional functionality. For example, a WiFi adapter may provide a list of access points.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A machine-implemented method, comprising:
   detecting one or more radio frequency (RF) samples with a device;
   determining burst data by identifying start and stop points of the one or more RF samples with a network management agent of the device;
   comparing time domain values for an individual burst of the burst data with time domain values of a predetermined RF device profile with the network management agent of the device;
   determining whether the time domain values for the individual burst match the time domain values of the predetermined RF device profile;
   determining a single carrier offset when the individual burst is offset from a scan center frequency;
   shifting a frequency of the individual burst in the time domain when the single carrier offset is determined;
   comparing Fast Fourier Transform (FFT) values for the individual burst with FFT values of the predetermined RF device profile, if the predetermined RF device profile has the time domain values approximately matching the time domain values for the individual burst with the network management agent of the device;
   generating a human-readable result indicating whether the shifted individual burst should be assigned to one of the predetermined RF device profiles with the network management agent of the device, wherein the human-readable result includes a difference vector in graphical form of a difference between FFT values for the individual burst and FFT values of the selected predetermined RF device profile; and
   assigning the FFT values for the individual burst to the predetermined RF device profile based on the difference.

2. The machine-implemented method of claim 1, further comprising:
   calculating time domain values for the individual burst with the network management agent of the device.

3. The machine-implemented method of claim 1, further comprising:
   calculating FFT values for the individual burst with the network management agent of the device.

4. The machine-implemented method of claim 1, further comprising:
   determining whether the FFT values for the individual burst approximately match the FFT values of the predetermined RF device profile with the network management agent of the device.

5. The machine-implemented method of claim 1, further comprising:
   assigning the individual burst to the predetermined RF device profile if the FFT values of the individual burst approximately match the FFT values of the predetermined RF device profile with the network management agent of the device;
   classifying the individual burst as being a WiFi device or a non-WiFi device with the network management agent of the device when assigned to the predetermined RF device profile; and
   determining an impact of the individual burst on a WiFi device when the individual burst is classified as the non-WiFi device.

6. The machine-implemented method of claim 1, wherein the predetermined RF device profiles have been previously identified within a certain proximity of the device or the predetermined RF device profiles are known RF devices.

7. A non-transitory computer-readable medium storing executable program instructions which cause a computer to perform operations, comprising:
   detecting one or more radio frequency (RF) samples;
   determining burst data by identifying start and stop points of the one or more RF samples;
   comparing time domain values for an individual burst of the burst data with time domain values of a predetermined RF device profile;
   determining whether the time domain values for the individual burst match the time domain values of the predetermined RF device profile;
   determining a single carrier offset when the individual burst is offset from a scan center frequency;
   shifting a frequency of the individual burst in the time domain when the single carrier offset is determined;
   comparing Fast Fourier Transform (FFT) values for the individual burst with FFT values of the predetermined RF device profile, if the predetermined RF device profile has time domain values approximately matching time domain values for the individual burst with the network management agent; and
   generating a human-readable result indicating whether the individual burst should be assigned to one of the predetermined RF device profiles with the network management agent, wherein the human-readable result includes a confidence level indicating a likelihood of having a match between the individual burst and the selected predetermined RF device profile, wherein the confidence level is based on a difference of a number of frequency domain FFT values for the individual burst and corresponding frequency domain FFT values of the selected predetermined RF device profile.

8. The computer-readable medium of claim 7, further comprising:
   calculating time domain values for the individual burst;
   determining whether the time domain values for the individual burst approximately match time domain values of a predetermined RF device.

9. The computer-readable medium of claim 8, further comprising: calculating frequency domain FFT values for the individual burst.

10. The computer-readable medium of claim 7, further comprising: determining whether the FFT values for the individual burst approximately match the FFT values of the predetermined RF device.

11. The computer-readable medium of claim 10, further comprising:
    assigning the individual burst to the predetermined RF device profile if the FFT values of the individual burst approximately match the FFT values of the predetermined RF device profile;
    classifying the individual burst as being a WiFi device or a non-WiFi device with the network management agent of the device when assigned to the predetermined RF device profile; and
    determining an impact of the individual burst on a WiFi device when the individual burst is classified as the non-WiFi device.

12. The computer-readable medium of claim 7, wherein the predetermined RF device profiles have been previously identified within a certain proximity to the RF device or the predetermined RF device profiles are known RF devices.

13. An apparatus, comprising:
- means for detecting one or more radio frequency (RF) samples with a client device; means for determining burst data by identifying start and stop points of the one or more RF samples with a network management agent located on the client device;
- means for comparing time domain values for an individual burst of the burst data with time domain values of a predetermined RF device profile with the network management agent;
- means for determining whether the time domain values for the individual burst match the time domain values of the predetermined RF device profile;
- means for determining a single carrier offset when the individual burst is offset from a scan center frequency;
- means for shifting a frequency of the individual burst in the time domain when the single carrier offset is determined;
- means for comparing Fast Fourier Transform (FFT) values for the individual burst with FFT values of the predetermined RF device profile, if the predetermined RF device profile has time domain values approximately matching time domain values for the individual burst with the network management agent; and
- means for generating a human-readable result indicating whether the individual burst should be assigned to one of the predetermined RF device profiles, wherein the human-readable result includes a difference vector in graphical form of a difference between FFT values for the individual burst and FFT values of the selected predetermined RF device profile; and
- means for assigning the FFT values for the individual burst to the predetermined RF device profile based on the difference.

14. The apparatus of claim 13, further comprising:
means for calculating time domain values for an individual burst with the network management agent.

15. The apparatus of claim 14, further comprising:
means for calculating FFT values for the individual burst with the network management agent; and
means for determining whether the FFT values for the individual burst approximately match the FFT values of the predetermined RF device with the network management agent.

16. The apparatus of claim 15, further comprising:
means for assigning the individual burst to the predetermined RF device profile if the FFT values of the individual burst match the FFT values of the predetermined RF device profile with the network management agent;
means for classifying the individual bust if assigned to the predetermined RF device profile as being a Wifi device or a non-WiFi device with the network management agent of the device; and
means for determining an impact of the individual burst on a WiFi device when the individual burst is classified as the non-WiFi device.

* * * * *

UNITED STATES PATENT AND TRADEMARK OFFICE
CERTIFICATE OF CORRECTION

PATENT NO. : 8,514,729 B2  
APPLICATION NO. : 12/418526  
DATED : August 20, 2013  
INVENTOR(S) : Warren Blackwell Page 1 of 1

It is certified that error appears in the above-identified patent and that said Letters Patent is hereby corrected as shown below:

In the Claims

At column 12, Claim Number 16, Line Number 23, change "bust" to --burst--.

Signed and Sealed this  
First Day of October, 2013

Teresa Stanek Rea  
*Deputy Director of the United States Patent and Trademark Office*